June 10, 1958  A. R. KUHN  2,838,626
ELECTRIC METER BY-PASS ARRANGEMENT
Filed March 15, 1957  6 Sheets-Sheet 1

INVENTOR.
ALFRED R. KUHN
BY John M. Calimafde
ATTORNEY

June 10, 1958 A. R. KUHN 2,838,626
ELECTRIC METER BY-PASS ARRANGEMENT
Filed March 15, 1957 6 Sheets-Sheet 2

Fig. 3

INVENTOR.
ALFRED R. KUHN
BY John M. Calimafde
ATTORNEY

INVENTOR.
ALFRED R. KUHN
BY John M. Calinafde
ATTORNEY

June 10, 1958          A. R. KUHN          2,838,626
ELECTRIC METER BY-PASS ARRANGEMENT
Filed March 15, 1957          6 Sheets-Sheet 4

INVENTOR.
ALFRED R. KUHN
BY John M. Calimafde
ATTORNEY

June 10, 1958  A. R. KUHN  2,838,626
ELECTRIC METER BY-PASS ARRANGEMENT
Filed March 15, 1957  6 Sheets-Sheet 5

Fig. 11

INVENTOR.
ALFRED R. KUHN
BY John M. Calimafde
ATTORNEY

INVENTOR.
ALFRED R. KUHN
BY John M. Calmafde
ATTORNEY

United States Patent Office 2,838,626
Patented June 10, 1958

2,838,626

ELECTRIC METER BY-PASS ARRANGEMENT

Alfred R. Kuhn, Queens Village, N. Y., assignor to Murray Manufacturing Corporation, Brooklyn, N. Y.

Application March 15, 1957, Serial No. 646,325

11 Claims. (Cl. 200—51.1)

This invention relates to a meter mount of a type used with a socket type meter; that is, a meter having contact blades extending from its base.

More specifically, this invention relates to an arrangement, in such meter mount, which is capable of by-passing the meter, thereby permitting the meter to be removed without interrupting the flow of current from the line to the load.

In copending application, Ser. No. 643,379, filed March 15, 1957, and assigned to the Murray Manufacturing Corp. of Brooklyn, N. Y., an adapter is described which is interposed between the meter and meter mount and is capable of by-passing the meter. The adapter described in the aforesaid application provided the additional function of by-passing the meter without altering the design of the meter or meter mount. The advantage in such a device is that it may be attached to existing meter mounts simply and easily.

However, in accordance with this invention the by-passing arrangement is constructed as part of the meter mount and not as an accessory thereto.

The socket type meter mount comprises generally two pairs of blade-receiving clips; the clips being positioned to receive the blades extending from the base of the meter. Line conductors are connected to one pair of clips and load conductors are connected to the other pair. Therefore, the load is connected to the line through the meter, and if the meter is removed, the circuit is interrupted. In other words, upon removal of the meter, service to the customer is interrupted.

As explained in the above mentioned application, electric meters for the protection of the public must be tested and calibrated at periodic intervals. In order to do this, the meter must be disconnected, which interrupts service to the customer. The present practice is for the service man to carry with him a "freshly" calibrated meter and substitute it for the meter to be tested. In this way, the utility company may test the meters in its laboratory which is especially equipped to perform this service. However, even when utilizing this technique, the service is interrupted momentarily when the "old" meter is removed from the meter mount and a newly calibrated meter is substituted in its place.

Ordinarily, a momentary interruption of service is of little significance; however, many business establishments, hospitals, doctors' offices, etc. cannot, in many instances, tolerate even a momentary interruption in service.

Accordingly, it is an object of this invention to provide a meter mount including a manually operable arrangement for by-passing, or shorting, the meter with no interruption in the flow of current to the load.

It is a feature of my invention to provide a by-passing arrangement which is capable of being sealed by the utility company to prevent tampering with the meter.

It is a further feature of my invention to provide a by-passing arrangement which utilizes a cross-bar, conventionally mounted in the trough.

It is still a further feature of my invention to provide an alternative arrangement which may be mounted in a trough which utilizes no cross-bar.

In accordance with a broad aspect of this invention, there is provided a meter mount, for a socket type meter having two pairs of contact blades extending from its base, comprising two pairs of blade-receiving clips, electrically insulated from each other and positioned to receive the blades from the meter. One pair of clips is connected to line conductors and the other pair is connected to load conductors. The invention is characterized by means, which is operable while the meter is connected to the clips, for shorting the line clips to the load clips, whereby the meter may be removed without interrupting the flow of current to the load.

In accordance with one aspect of the invention, the means for operating the shorting means is mounted on a cross-bar mounted on the trough.

In accordance with a second aspect of the invention, the trough which is utilized does not include a cross-bar and the means for operating the shorting means is mounted uniquely on the underside of a cover of the trough.

The above-mentioned and other features and objects of this invention and the manner of attaining them will become more apparent and the invention itself will be best understood by reference to the following description of alternative embodiments of the invention taken in connection with the accompanying drawings, in which.

Figure 1:
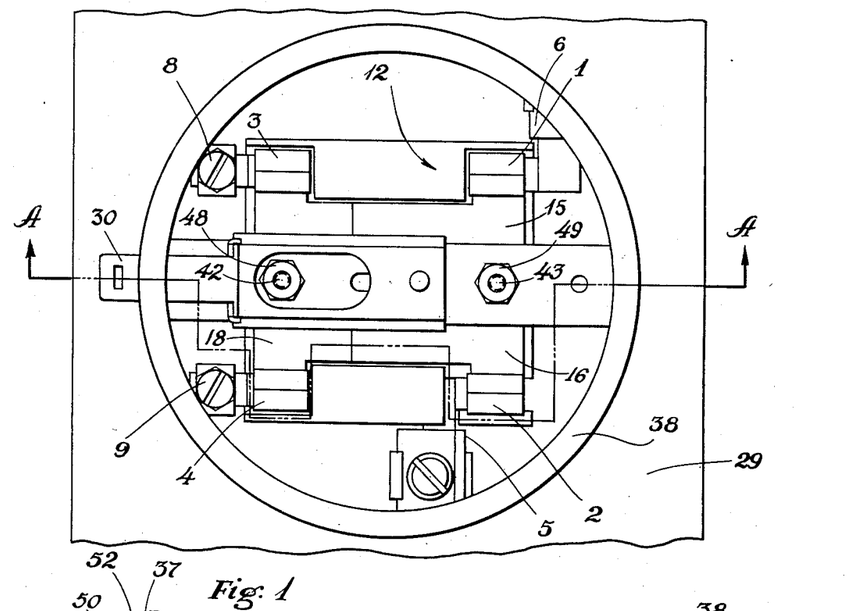
Fig. 1 is a plan view of one embodiment of my invention.

The meter mount to which my invention relates comprises essentially two pairs of clips 1, 2 and 3, 4 (Figs. 1, 2 and 3) which are electrically insulated from each other and positioned to receive contact blades from a meter (not shown). This permits the simplest type of meter connection; i. e., the meter simply "plugs-in" to the mount. One pair of clips 1, 2 are connected to the line conductors via connectors 5, 6 and conductive bars, one of which is shown at 7. The other pair of clips 3, 4 are connected to the load conductors via connectors 8, 9 and conductive bars 10, 11, respectively. Thus, under normal circumstances, the load is connected to the line through the meter.

Figure 3:
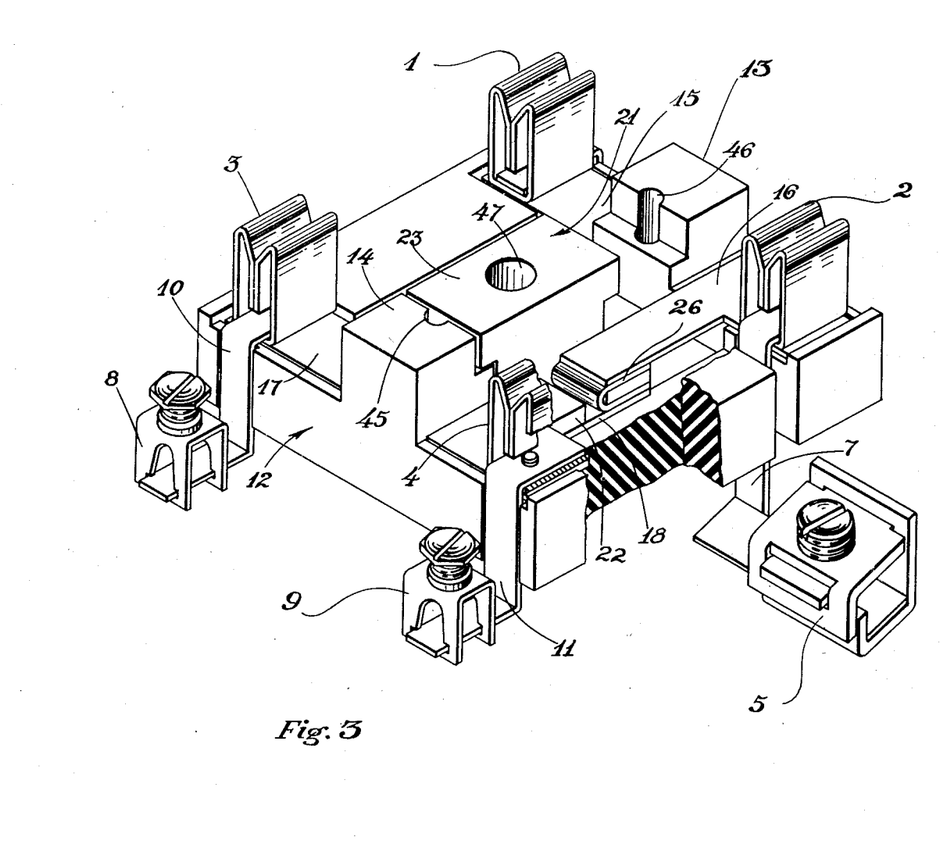
Fig. 3 is a perspective view of the meter mount excluding the trough.

The two pairs of clips 1, 2 and 3, 4 are mounted on an insulated base 12 having a centrally located recessed portion and two raised portions 13, 14 at opposite ends thereof. The purpose of the raised portions 13, 14 is for connection to the trough, which will be described later. The clips are mounted to the insulator base by any suitable means, such as bolts and nuts.

Two pairs of flat conductive bars 15, 16 and 17, 18 (two of which are shown in detail in Fig. 4) are connected to the respective clips 1, 2, 3, 4 preferably by the same means which are used for mounting the clips to the base. One pair of bars 15, 16 are planar and the other pair 17, 18 are formed in the shape of a Z. Each of the bars include a leg portion 19 extending at right angles to the remainder of the bar. As shown, the leg portions of the bars are connected to the clips so that the remainder of the bars may extend over the recessed portion.

Figures 4, 5:
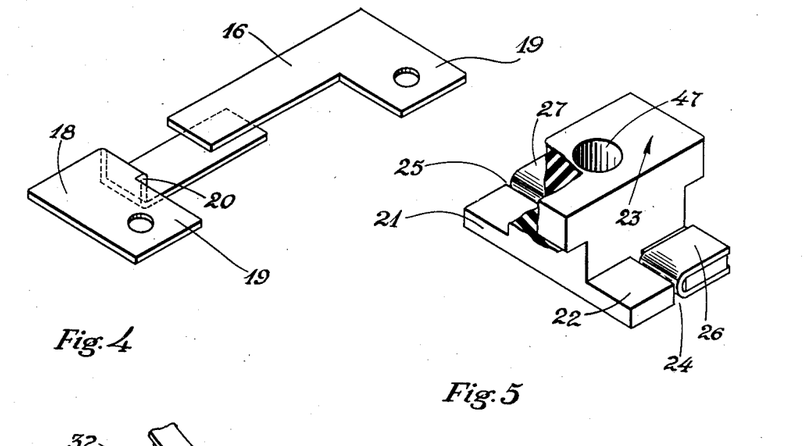
Fig. 4 is a perspective view of two opposing conductive bars.
Fig. 5 is a perspective view of an insulator carrier for a pair of shorting contacts.

Each pair of bars are positioned to extend towards the other pair with the flat portions thereof parallel and spaced apart. The distance between the parallel bars is determined essentially by the vertical leg 20 of the Z bars, and the lengths of the bars are such that the end portions of the opposite pairs overlap.

An insulator carrier 21, shown in detail in Fig. 5, is provided in the recessed space between the opposite pairs of bars 15, 16, 17 and 18. The carrier is in the shape of a T comprising a rectangular planar portion 22 and a block portion 23 extending across one dimension of the planar portion, intermediate the ends of the other dimension, and projecting perpendicularly therefrom.

The planar portion 22 on opposite sides of the block portion 23 is provided with slots 24, 25 extending from the ends thereof towards the block portion.

A pair of U shaped contacts 26, 27 are mounted in the slots 24, 25 respectively, with the base of the U fitting into the slot and the opposite legs of the U bearing against the opposite surfaces of the planar portion 22. The width of the contacts is greater than the space between the overlapped portions of the bars, whereby when the contacts are moved into the spaces, the bars and thus the clips are shorted.

The carrier is properly positioned on the base so that the contacts are aligned with the spaces between the opposite bars.

Figures 6, 7:
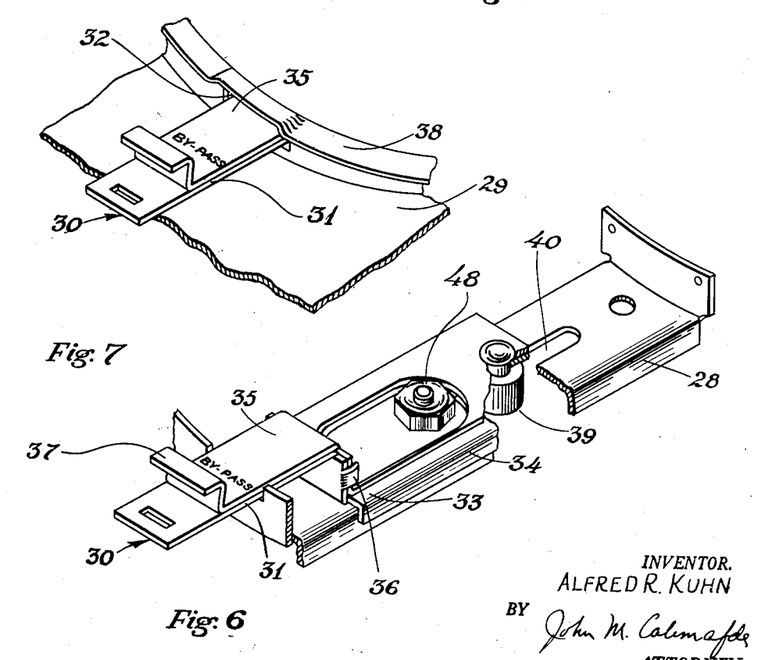
Fig. 6 is a perspective view of the cross-bar and manually operable means for operating the insulator carrier.
Fig. 7 is a fragmentary view of the manually operable means as seen from the outside of the trough.
Figure 8:
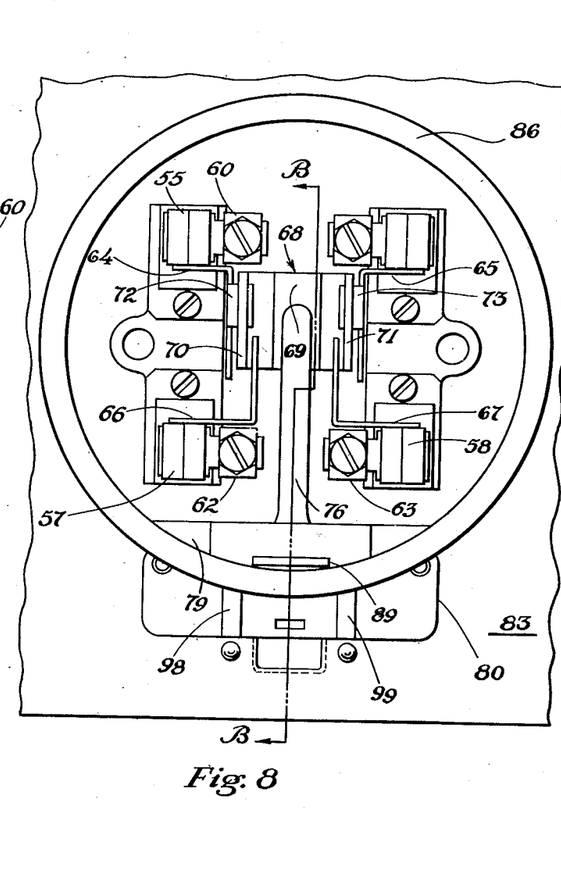
Fig. 8 is a plan view of another embodiment of my invention adapted for a trough without a cross-bar.

A cross-bar 28, shown in detail in Fig. 6 is attached to a cover 29, preferably by spot-welding (Figs. 2 and 6) and supports the means for operating the carrier.

A manually operable member 30 for controlling the movement of the insulator carrier is slidably mounted on the cross-bar 28. The member 30 comprises a handle portion 31 which passes through an opening 32 (Fig. 7) in the cover 29 of the trough and a portion 33 contiguous with the cross-bar 28. The contiguous portion 33 includes flanges 34 along the opposite edges thereof enclosing the edges of the cross-bar, whereby movement of the member 30 is guided in a linear direction.

A tab member 35 generally adjacent to the member 30 is secured thereto, by a pair of opposite finger clasps 36, integral with the angular wall of member 30 and holding the corresponding wall of the tab member 35. The tab member 35 comprises an extension 37 which is shaped to fit snugly under a raised portion of flange 38 of the cover 29 when the member 30, and therefore carrier 21, is in one extreme position such that the meter is effectively in circuit and the by-pass arrangement is ineffective.

The manually operable member 30 is coupled to the carrier 21 by means of a shoulder rivet 39 which partly passes through and is slidable in, slot 40 in the cross-bar 28.

The meter mount is assembled as follows:

The Z shaped bars 17, 18, clips 3, 4 and connectors 8, 9 are mounted on the insulator base 12. The insulator carrier 21, with U shaped contacts 26, 27 is positioned and then the bars 15, 16, clips 1, 2 and connectors 5, 6 are mounted. The assembled base is mounted on a bridge 41 by means of stud bolts 42, 43 extending through flanges of the bridge 41; and the bolts being permanently attached to the bridge. The bridge member is bolted to the trough 44 as shown. The stud bolts 42, 43 pass through holes 45, 46 at opposite ends of the base through the raised portions 13, 14.

The member 30 and tab 37 secured thereto are slidably mounted on the cross-bar 28 by means of the shoulder rivet 39. The handle 31 of member 30 is passed through the opening 32 in the cover 29 and the cross-bar is welded thereto.

The cover and cross-bar assembly is placed on the trough 44 with shoulder rivet 39 fitted snugly into opening 47 in the carrier 21. The stud bolts 42, 43 are passed through appropriate openings in the cross-bar 28, and nuts 48, 49 (Fig. 1) engage the bolts to secure the cover 29 on the trough 44.

Figure 2:
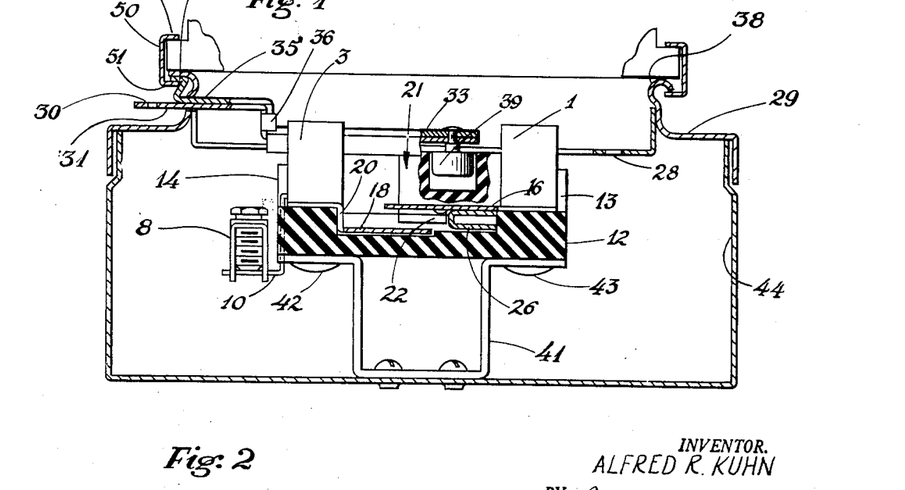
Fig. 2 is a side view taken along lines A—A of Fig. 1.

As best seen in Fig. 2, the flange 38 of the cover 29 is substantially coextensive with edge of the meter. A ring member 50 is employed to seal the meter mount to the meter to prevent tampering. The ring member extends around the periphery of the meter and cover, and comprises flanges 51, 52. The flange 51 encloses the tab extension 37 and rim flange 38, and flange 52 encloses the meter edge.

When the ring member 50 is in position as shown in Fig. 2, it is an indication that the by-pass arrangement is ineffective and the meter is in circuit. If it is desired to by-pass the meter, without interrupting the flow of current to the load, the ring member 50 is opened and the manually operable member 30 is "pulled-down" causing the U shaped contacts to enter the spaces between the overlapped bar portions, thereby shorting the line clips to the load clips.

A visual indication, such as the words "By-Pass," may be printed on the handle portion 31 of the member 30 which becomes visible only when the member 30 is "pulled-down" sufficiently. In this way the service man is given positive information that the meter is shorted so that he may remove it without interrupting the service to the customer.

Referring now to the remaining Figures 9–13, there is illustrated a second embodiment of my invention. In function, the second embodiment is essentially the same as the first embodiment; however, the structure of the meter mount has been modified to accommodate it to a trough having no cross-bar.

It will be recalled that the cross-bar served to secure the cover to the trough and supported the operating mechanism. The structure of the embodiment which performs those functions will now be described.

Referring first to Figs. 8, 9, 10 and 11, the meter mount comprises two pairs of clips 55, 56 and 57, 58 mounted on an insulated base 59. Line connectors 60, 61 are connected to clips 55, 56 and load connectors 62, 63 are connected to clips 57, 58.

Figure 11:
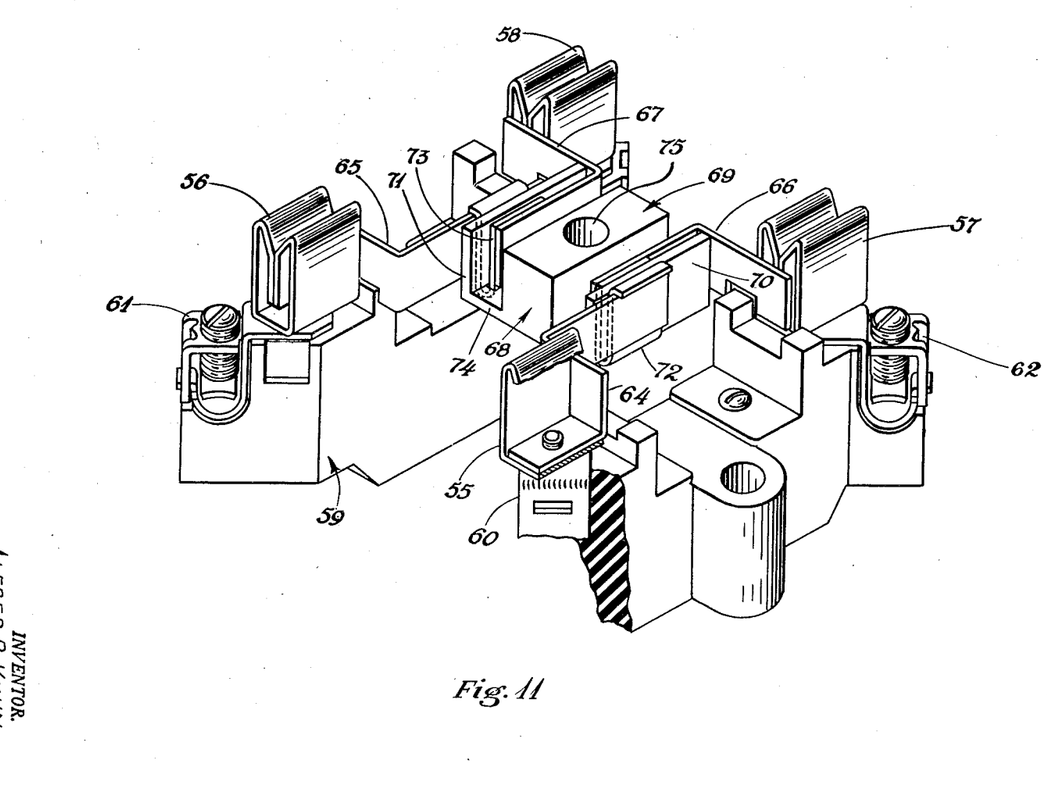
Fig. 11 is a perspective view of the meter mount excluding the trough.

Two pairs of flat conductive bars 64, 65 and 66, 67 are connected to the clips 55, 56, 57 and 58 respectively. The bars comprise an L portion which is mounted so that the flat part thereof is upright and a portion extending at right angles to the leg of the L for connection to the clips as shown.

The two pairs of bars 64, 65 and 66, 67 are positioned to extend towards each other with the flat portions of opposite pairs parallel and spaced apart a predetermined distance. As in the first embodiment, the lengths of the bars are such that the end portions of opposite pairs overlap.

The insulator carrier 68 of this embodiment is in the form of an E with the center lateral extension 69 being substantially wider than the opposite legs 70, 71.

A pair of U shaped contacts 72, 73 are mounted respectively on the opposite legs 70, 71, passing through suitable slots in the base 74 of the E shaped carrier. The opposite sides of the U contacts bear against the opposite surfaces of the legs 70, 71 respectively, and the width of the U contacts is greater than the space between the overlapped portions of the opposite bars.

As shown, the outer leg of the U shaped contacts is turned outwardly at the upper end thereof. The turned-out portions of the contacts ride along the upper edge of the flat bars 64 and 65 respectively. If desired, the inner legs of the contacts may be formed to ride on bars 66, 67; this is only a matter of design. Thus, the carrier assembly is supported by means of the turned-out portions riding on two of the bars.

The base 59 comprises two halves separated a given distance as shown in Fig. 11 and the carrier 68 is slidably mounted between these halves. The two halves of the base are securely mounted on a bracket (not shown) which is affixed to the trough.

Figure 10:
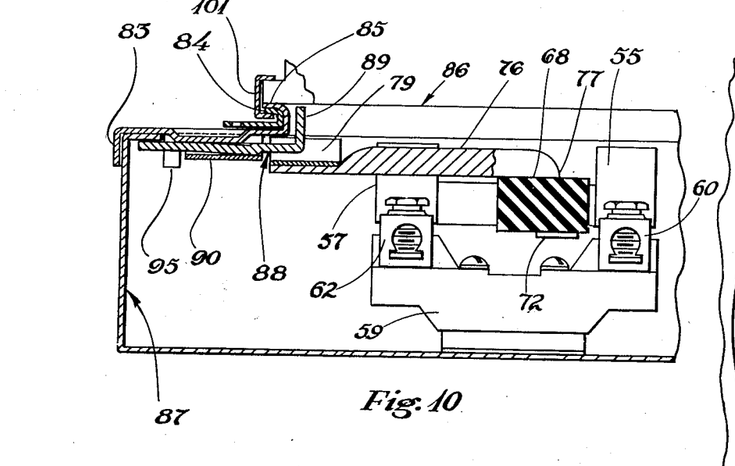
Fig. 10 is a view taken along lines B—B of Fig. 8.
Figure 12:
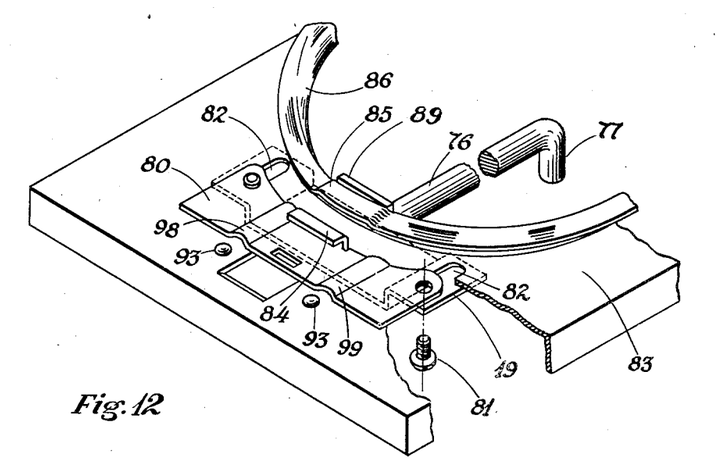
Fig. 12 is a top-perspective view of the manually operable shorting means.
Figure 13:
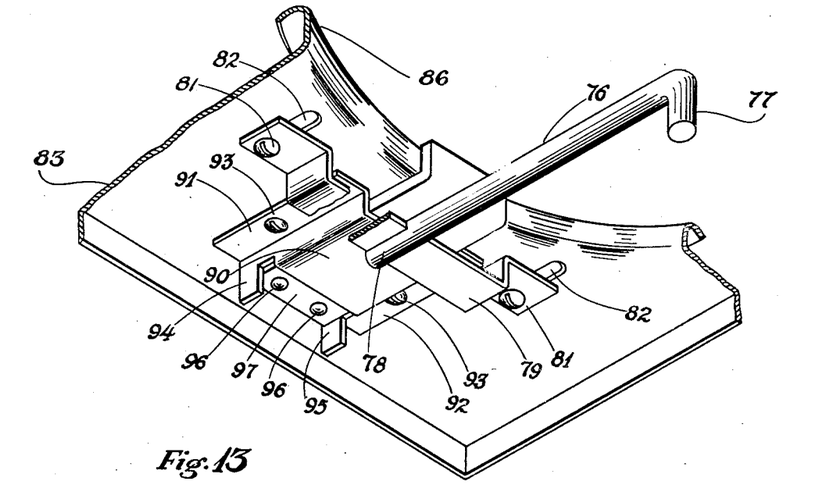
Fig. 13 is a bottom-perspective view of the arrangement shown in Fig. 12.

The mechanism controlling the movement of the carrier 68, best seen in Figs. 10, 12 and 13, comprises a rod 76 having one end 77 bent to fit, with slight play, into a hole 75 in the center leg of the carrier and the opposite end 78 attached, preferably by welding or brazing, to a movable bridge member 79.

The bridge member 79 is secured to a plate member 80, best seen in Fig. 12 by means of screws 81 passing through elongated slots 82 in the cover 83. Thus, movement of the plate member 80 correspondingly moves bridge member 79, rod 76 and carrier 68.

The plate member 80 comprises a tab 84 extending from the plane of the plate member so as to fit snugly under a raised portion 85 of a flange 86 on the cover of the trough when the carrier is in one extreme position, such that the meter is effectively in circuit, or the by-pass arrangement is ineffective.

Thus, the operating mechanism of this embodiment does not require a cross-bar for support, and no holes larger than screw size are required in the cover. It will be recalled that the manually operable member of the first embodiment passed through a relatively large opening to the outside of the cover. In this embodiment the opening has been eliminated.

The cover 83 may be secured to the trough by any suitable means; for example one means comprises a latch member 88 having a turned-up portion 89 at one end thereof and slidably mounted between the underside of the cover 83 (Fig. 13) and a retaining bracket 90. The bracket 90 includes flanges 91, 92 and is attached at the flanges to the underside of the cover by means such as screws 93. At one end of the bracket, legs 94, 95 are struck-up which serve as a stop and as a positioning aid when placing the cover on the trough. The edge of the trough is turned-in and when the cover is placed over the trough, it is positioned so that the edges of the legs 94, 95 abut the edge of the turned-in portion. The latch is then operated to slide under the turned-in portion of the trough, thereby securing the cover to the trough. The extent of slidable travel of the latch is limited in the locking direction by the turned-up portion 89 abutting the inside surface of the flange 86, and in the opening direction by projections 96 abutting an edge 97 of the bracket 90 as shown.

This means of attaching the cover to the trough is conventional. Therefore, the bridge member 79 is formed to fit around the bracket 90, thereby obviating the necessity for altering the standard design of the latching mechanism.

Figure 9:
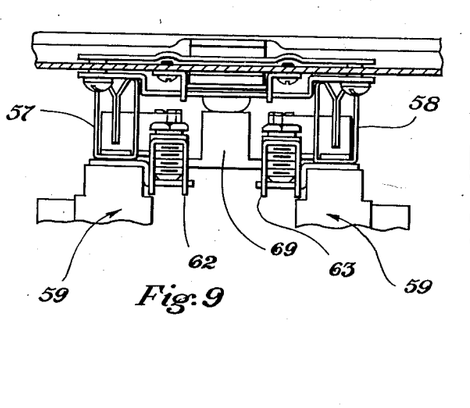
Fig. 9 is an end view of the by-passing arrangement with the trough wall removed.

As best seen in Figs. 9 and 12, the movable plate member 80 is provided with raised portions 98, 99 so that the plate may ride freely over the screws 93.

As explained in connection with the first embodiment, the peripheral edge of the meter is coextensive with the flange on the cover of the trough. Thus, referring to Fig. 10, the meter is clamped, or sealed, to the mount by a ring 101, enclosing on one side the tab and cover flanges and on the other side the meter. When it is desired to operate the by-pass arrangement, the ring is detached and the plate "pulled-down."

While I have described above the principles of my invention in connection with specific apparatus, it is to be clearly understood that this description is made only by way of example and not as a limitation to the scope of my invention as set forth in the objects thereof and in the accompanying claims. For example, although I have described a meter and meter mount having only two pairs of blades and clips respectively, my invention may be used with equal facility where a greater number of blades and clips are required.

What is claimed is:

1. A meter mount, for a socket type meter having two pairs of oppositely disposed contact blades extending from its base, said meter mount comprising an insulator base, two pairs of clips, electrically insulated from each other, and mounted on said base to receive the blades from the meter, one pair of clips being for connection to the line conductors, the other pair of clips being for connection to the load conductors, a pair of conductive members controllably movable to short one pair of said clips to the other pair, and manually operable means for positively moving said conductive members into the shorting position while said meter is connected in the operating position in said mount, whereby the meter may be removed without interrupting the flow of current to the load.

2. A meter mount, for a socket type meter having two pairs of oppositely disposed contact-blades extending from its base, said meter mount comprising an insulator base, two pairs of clips, electrically insulated from each other, and mounted on said base to receive the blades from the meter, one pair of clips being for connection to the line conductors, the other pair of clips being for connection to the load conductors, two pairs of conductive bars, means connecting said pairs of bars to said pairs of clips respectively, each pair of bars being positioned to extend towards the other pair, the lengths of said bars being such that the end portions thereof overlap and said overlapped portions being spaced apart, a movable insulator carrier for a pair of contacts attached thereto, said carrier being positioned to move in the space between said opposite pairs of bars and said contacts being positioned to move into the spaces between the respective overlapped portions, the width of said contacts being greater than the corresponding dimension of the space between said bars whereby when said contacts enter the spaces said opposite pairs of bars are shorted together, and manually operable means attached to said carrier whereby when it is desired to by-pass the meter, said manually operable means is operated to move the contacts into the spaces between said overlapped bars.

3. The mount according to claim 2, wherein one pair of said bars is substantially planar and the other pair of said bars is in the shape of a Z, wherein the lower leg of the Z extends parallel to the associated bar of said one pair and the upper leg of the Z is attached to its associated clip.

4. The mount according to claim 3, wherein said carrier is in the shape of a T comprising a rectangular planar portion and a block portion extending across one dimension of said planar portion and intermediate the ends of the other dimension thereof and projecting perpendicularly therefrom, said pair of contacts being mounted on opposite sides of said block portion, and means attaching said manually operable means to a surface of said block parallel to said planar portion.

5. The mount according to claim 4, wherein the planar portion on opposite sides of said block portion are provided with slots extending from the ends towards said block portion and said contacts are U in shape, the base of the U fitting into the slot and the opposite legs of the U bearing against the opposite surfaces of the planar portion.

6. A meter mount and enclosure assembly, the enclosure comprising an open box-shaped trough, a bridge member extending from the base of the trough and attached thereto, the meter mount being for a socket meter of a type having two pairs of oppositely disposed contact-blades extending from its base, said meter mount comprising an insulator base attached to said bridge member, two pairs of oppositely disposed clips, electrically insulated from each other, and mounted on said base to receive the blades from the meter, one pair of clips being for connection to the line conductors, the other pair of clips being for connection to the load conductors, two pairs of flat conductive bars, means connecting said pairs of bars to said pairs of clips respectively, one pair of said bars being planar and the other pair being in the shape of a Z, each pair of bars being positioned to extend towards the other pair with the flat portions of opposite pairs being parallel and spaced apart, the distance between said parallel bars being determined essentially by the vertical leg of the Z, the lengths of said bars being such that the end portions of opposite pairs thereof overlap, a movable insulator carrier in the shape of a T comprising a rectangular planar portion and a block portion extending across one dimension of said planar portion and intermediate the ends of the other dimension thereof and projecting perpendicularly therefrom, the planar portion on opposite sides of said block portion being provided with slots extending from the ends thereof towards said block portion, a pair of U shaped contacts mounted in said slots respectively, the base of the U fitting into the slot, the opposite legs of the U bearing against the opposite surfaces of said planar portion, and the width of said contacts being greater than the space between said overlapped portions of said bars, means mounting said carrier so that said contacts are aligned to slide into and out of said space between said overlapped bars, said means comprising a cross-bar extending in the same direction as said pairs of conductive bars diametrically across the opening of said trough and attached at opposite ends thereto, said cross-bar having an elongated slot, a manually operable member slidably mounted on said cross-bar and extending through an opening in said trough to the outside thereof, said slidable member having a flat surface contiguous with a surface of said cross-bar and flanges along the opposite edges thereof enclosing the edges of said cross-bar whereby movement of said slidable member is guided in a linear direction, means slidable in the slot of said cross-bar and attaching said manually operable member to the block portion of said insulator carrier; said trough including a rim portion surrounding the opening thereof, one edge of said rim being secured to the trough and the other edge having a flange against which the meter is mounted, the flange being substantially coextensive with the edge of the meter, a tab member secured to said manually operable member and having a portion extending therefrom adjacent said flange when said manually operable member is in one extreme position such that the meter is effectively in circuit, and a ring member extending around the periphery of the meter and rim and having flanges along opposite edges thereof enclosing the rim and tab portion on one side and the edge of the meter on the other side, whereby when it is desired to short the meter the ring member is removed and the manually operable member is operated to move the contacts into the space between the overlapped portions of the conductive bars.

7. A meter mount, for a socket type meter of the type having two pairs of oppositely disposed contact-blades extending from its base, said meter mount comprising an insulator base, two pairs of conductive clips, electrically insulated from each other, mounted on said base and positioned to receive the meter blades, a first pair of said clips being for connection to line power conductors, the second pair of said clips being for connection to the load conductors, two pairs of flat conductive bars connected respectively to said two pairs of clips, the bars being mounted along a longitudinal edge thereof and each pair extending towards the other pair, the lengths of said bars being such that the end portions of opposite pairs overlap and the overlapped portions being spaced a given distance apart, an insulator carrier for a pair of contacts located between the opposite pairs of said bars, means including said pair of contacts for slidably supporting said insulator carrier with said contacts being aligned with the spaces between said overlapped portions, the width of said contacts being greater than the corresponding dimension of said spaces, whereby when said contacts enter the spaces said opposite pairs of bars are shorted together, and manually operable means connected to said carrier for controllably moving said carrier and contacts into the position for shorting said opposite pairs of bars together whereby the meter may be removed without interrupting the flow of current to the load.

8. The mount according to claim 7, wherein said insulator carrier is in the shape of an E and each of said contacts is in the shape of a U, said contacts being mounted respectively on the two end legs of the E, the base of the E being provided with a pair of slots located adjacent said end legs respectively, each of said contacts being mounted so that the base of the U lies on the underside of the base of the carrier with one leg thereof passing through the slot and bearing against the inside surface of one end leg of the E, and the other leg of the U bearing against the outside surface of said one end leg of the E, one leg of each U including a flange at the upper end thereof for slidably riding on a longitudinal edge of a conductive bar, said pair of contacts riding respectively on one of said pairs of bars, whereby said carrier and contacts are supported on said one pair of bars, and said manually operable means being connected to the center leg of said E shaped carrier.

9. The mount according to claim 8 wherein said manually operable means comprises a rod attached at one end to the center leg of said E shaped carrier and attached at the opposite end to a first movable member, a trough for said meter mount having one side open, a cover closing said trough, but leaving sufficient space for the meter to be mounted on said meter mount, said first movable member being slidably mounted to the underside of said cover, a second movable member slidably mounted to the outside of said cover, and means passing through elongated slots in said cover for connecting said first member to said second member, the length of said slots limiting the length of travel of said carrier.

10. A meter mount, for a socket type meter of the type having two pairs of oppositely disposed contact-blades extending from its base, said meter mount comprising an insulator base, two pairs of oppositely disposed conductive clips, electrically insulated from each other, and mounted on said base to receive the meter blades, a first pair of said clips being for connection to the line conductors, the second pair of said clips being for connection to the load conductors, two pairs of flat conductive bars connected respectively to said two pairs of clips, the bars being mounted along a longitudinal edge thereof and each pair extending towards the other pair, the lengths of the bars being such that the end portions of opposite pairs overlap and are spaced a given distance apart, an insulator carrier for a pair of U shaped contacts and located between the opposite pairs of said bars, said carrier being in the shape of an E and each of said contacts being in the shape of a U, said contacts being mounted respectively on the two end legs of the E, the base of the E being provided with a pair of slots located adjacent said end legs respectively, each of said contacts being mounted so that the base of the U lies on the underside of the base of the carrier with one leg thereof passing through the slot and bearing against the inside surface of one end leg of the E, and the other leg of the U bearing against the outside surface of said one end leg of the E, one leg of each U including a flange at the upper end thereof for slidably riding on a longitudinal edge of a conductive bar, said pair of contacts riding respectively on one of said pairs of bars, whereby said carrier and contacts are supported on said one pair of bars, said carrier being positioned such that the contacts are aligned with the spaces between the overlapped portions of said bars, the width of said contacts being greater than the corresponding dimension of said spaces, whereby when said contacts enter the spaces said opposite pairs of bars are shorted together, a rod attached at one end to the center leg of said E shaped carrier and attached at the opposite end to a movable bridge member, a trough for said meter mount having one side open, a cover closing said trough but leaving sufficient space for the meter to be mounted on said meter mount, said cover including a flange extending around the opening thereof for supporting the meter, said bridge member being positioned on the underside of the cover, a movable plate member positioned on the outside of the cover, means passing through elongated slots in the cover connecting said bridge member to said movable plate, said movable plate comprising a tab portion extending therefrom and shaped to underlie said cover flange when said rod is in one extreme position such that the shorting arrangement is ineffective, and a ring member shaped to surround the peripheral edge of said flange and meter and having flanges along the opposite edges thereof, one flange enclosing said cover flange and underlying tab portion and the other flange bearing against the edge of the meter, whereby when it is desired to short the meter said ring member is detached freeing said tab portion, and said plate member is operated to move said contacts into the spaces between said bars thereby shorting the opposite pairs of clips together.

11. The meter mount according to claim 10, wherein said cover is attached to said trough by means of a slidable latch member having a flange located in the opening of said cover flange, the latch lying adjacent to the underside of said cover, retaining a bracket supporting said latch in contiguous relation with said cover, said trough having a flange extending inwardly underlying said cover, said latch being adapted to slide under said flange thereby securing the cover to the trough.

References Cited in the file of this patent

UNITED STATES PATENTS

| | | |
|---|---|---|
| 2,066,299 | Mylius | Dec. 29, 1936 |
| 2,192,826 | Cole | Mar. 5, 1940 |
| 2,370,043 | Johansson | Feb. 20, 1945 |
| 2,747,049 | Johansson | May 22, 1956 |
| 2,747,050 | Johansson | May 22, 1956 |